United States Patent
Sedazzari

(10) Patent No.: US 10,394,005 B2
(45) Date of Patent: Aug. 27, 2019

(54) TELECENTRIC LENS

(71) Applicant: Claudio Sedazzari, Mantova (IT)

(72) Inventor: Claudio Sedazzari, Mantova (IT)

(73) Assignee: OPTO ENGINEERING S.R.L., Mantova (IT)

( * ) Notice: Subject to any disclaimer, the term of this patent is extended or adjusted under 35 U.S.C. 154(b) by 495 days.

(21) Appl. No.: 15/035,410

(22) PCT Filed: Sep. 29, 2014

(86) PCT No.: PCT/IB2014/064927
§ 371 (c)(1),
(2) Date: May 9, 2016

(87) PCT Pub. No.: WO2015/079335
PCT Pub. Date: Jun. 4, 2015

(65) Prior Publication Data
US 2016/0291297 A1    Oct. 6, 2016

(30) Foreign Application Priority Data
Nov. 29, 2013    (IT) .............................. BS2013A0179

(51) Int. Cl.
| F21V 5/00 | (2018.01) |
| G02B 13/22 | (2006.01) |
| G01B 11/02 | (2006.01) |

(52) U.S. Cl.
CPC ............. G02B 13/22 (2013.01); F21V 5/008 (2013.01); G01B 11/02 (2013.01)

(58) Field of Classification Search
CPC .......... G02B 13/22; G01B 11/02; F21V 5/008
See application file for complete search history.

(56) References Cited

U.S. PATENT DOCUMENTS

| 3,941,484 A | 3/1976 | Dreyfus |
| 5,149,980 A | 9/1992 | Ertel et al. |
| 5,453,877 A | 9/1995 | Gerbe et al. |
| 5,745,236 A | 4/1998 | Haga |
| 5,842,060 A | 11/1998 | White et al. |
| 6,324,296 B1 * | 11/2001 | McSheery ................. G06T 7/80 356/623 |
| 6,667,762 B1 | 12/2003 | Bouvier et al. |
| 2003/0151823 A1 | 8/2003 | Okabe |
| 2008/0251504 A1 * | 10/2008 | Lu .......................... G02B 27/46 359/629 |
| 2013/0258431 A1 * | 10/2013 | Guidi ................. G02B 27/0103 359/13 |

FOREIGN PATENT DOCUMENTS

| JP | H08 334691 A | 12/1996 |
| WO | 2009/130062 A1 | 10/2009 |

OTHER PUBLICATIONS

International Search Report dated Mar. 26, 2015.

* cited by examiner

*Primary Examiner* — Y M. Lee
(74) *Attorney, Agent, or Firm* — Arent Fox LLP; Michael Fainberg

(57) ABSTRACT

A method and a device for the optical viewing of objects, the method comprising the stages of illuminating an object with ultraviolet radiation, and acquiring an image of the object thereby illuminated using a lens comprising at least a forward optical group and an aperture diaphragm exhibiting a transparent window located at a focal point of the forward optical group defined for the ultraviolet radiation.

9 Claims, 2 Drawing Sheets

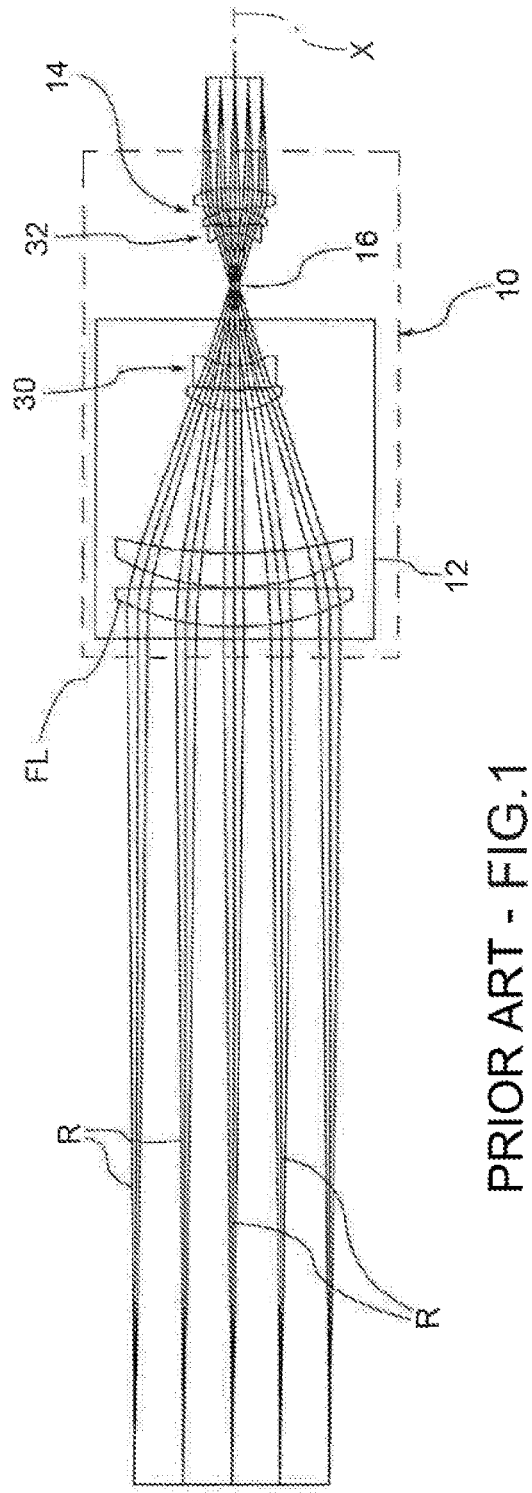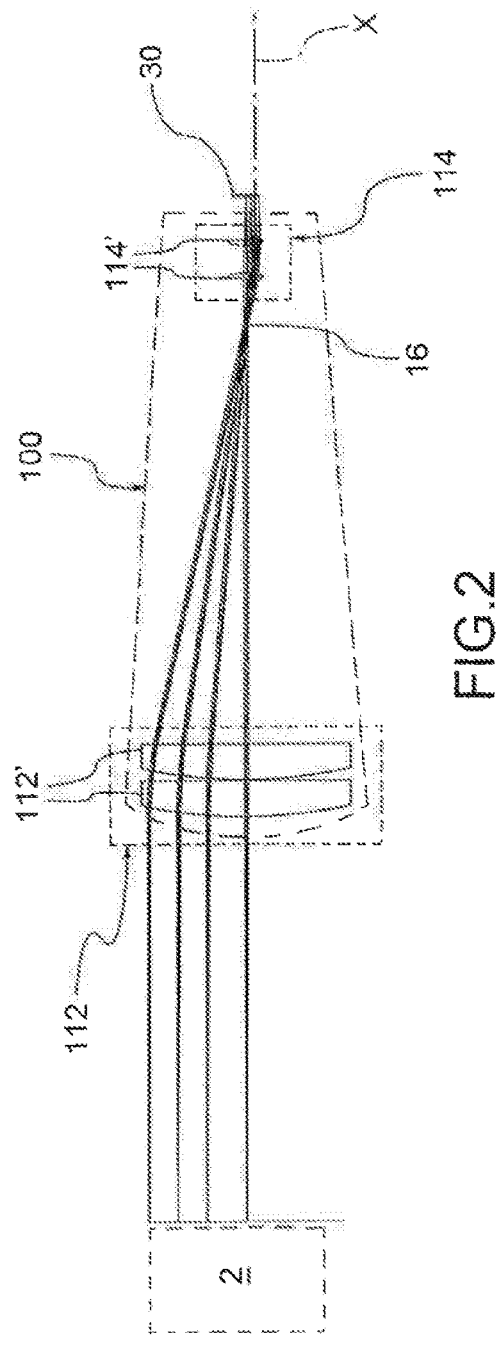

TELECENTRIC LENS

The present invention relates to a telecentric lens to be used in an appliance for artificial vision, in particular for performing dimensional measurements of objects.

As is known, the artificial vision commonly uses telecentric lenses for dimensional measurement applications. FIG. 1 shows an optical diagram of a telecentric lens according to the prior art.

A telecentric lens 10 has a main opto-mechanical axis X and includes a front optical group 12 adapted to receive the rays coming from an object to be observed and a rear optical group 14 adapted to convey said rays towards a sensor of the vision appliance. The telecentric lens 10 differs from a conventional, or "entocentric" lens in that it accepts, from the object observed, only those cones of rays R whose center of gravity ray (or main ray) is parallel to the main opto-mechanical axis X. For this reason, a telecentric lens must have a front lens FL at least as wide as the diagonal of the object to focus. In a telecentric lens, aperture 16 is placed in the focus of the front group: this means that the entry pupil is seen, by the rays entering the optical system, as if it were in the infinite. In fact, this type of lenses is called telecentric precisely because the entry pupil (or the "centre" of an optical system) is virtually infinite.

Telecentric lenses are used mainly because they allow optically correcting the parallax error, that is, the phenomenon by which objects that are closer to the observer appear to be relatively larger. Irrespective of the working distance, in fact, with a telecentric lens the dimensions of the framed object remain the same.

By virtue of the dimensions currently in use of aperture 16 and in order to correct the optical aberrations of the telecentric lens, the telecentric lenses require a significant number of lenses, normally each shaped different from the other and in particular one or more negative focal lenses 30 and 32 normally manufactured using a high-dispersion glass, also called "flint" glass, as shown for example in FIG. 1. It is noted that the manufacture of negative focal lenses is normally more complex and expensive than the manufacture of positive focal lenses since the first require at least one of the optical surfaces to be made with a concave shape. In addition, flint glasses are usually more expensive than the more common low-dispersion glasses, also called "crown" glasses, and this difference in cost is significant in the manufacture of the lenses.

In order to correct the chromatic aberration, the use of flint glasses is needed to make each telecentric lens operating in the visible spectral region or in any case in a spectral region large enough to cause a significant loss of resolution of the same telecentric lens if only crown glasses are used, usually insufficient to provide for the correction of such an aberration.

The greater complexity of manufacture of such negative lenses 30 and 32, combined with the variety of shapes required and the overall number of optical components required for the manufacture of a telecentric lens, in addition to making the cost high, make the manufacture thereof complicated since these constructive aspects cause a greater difficulty in obtaining an optimal alignment of the lens assembly.

The object of the present invention is to propose a telecentric lens capable of obviating the drawbacks mentioned above with reference to the prior art.

Another object of the invention is to propose a telecentric lens having a simpler structure, and therefore more reliable, less expensive and less bulky, compared to that of the telecentric lenses currently known, without affecting the quality of the digital image obtained.

Said objects are achieved with a telecentric lens according to claim 1. The dependent claims describe preferred embodiments of the invention.

The features and the advantages of the telecentric lens according to the invention shall be made readily apparent from the following description of preferred embodiments thereof, provided purely by way of a non limiting example, with reference to the accompanying figures, in which:

FIG. 1 shows the optical diagram of a telecentric lens made according to the prior art;

FIG. 2 shows the optical diagram of a telecentric lens according to the invention;

Figure 3:
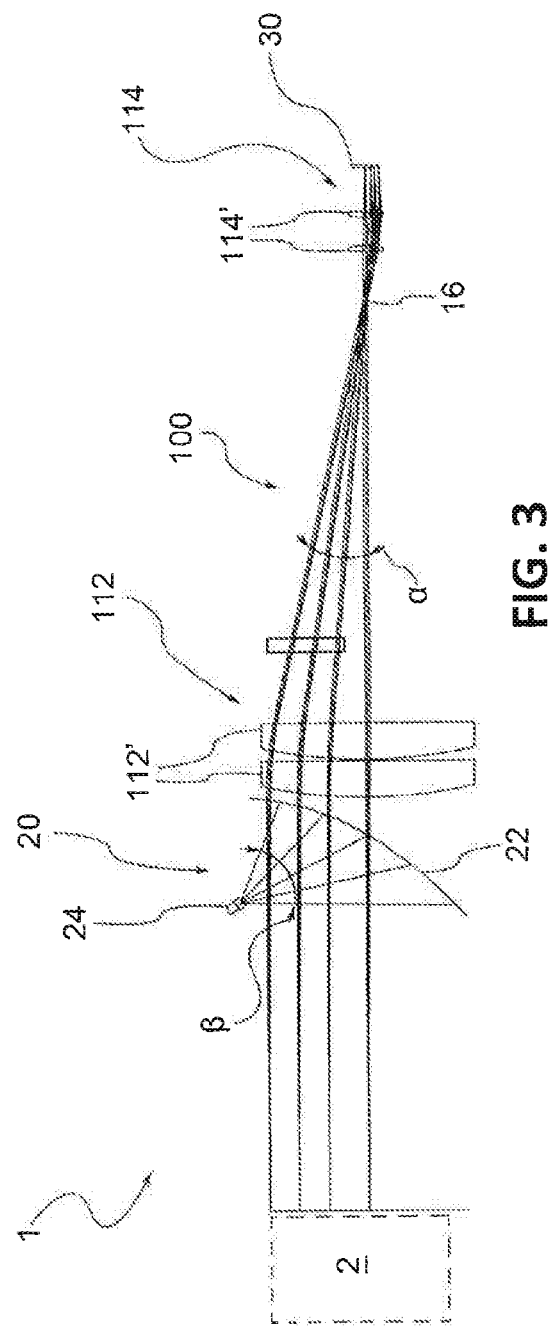
FIG. 3 is an optical diagram of a vision appliance comprising the telecentric lens of FIG. 2.

With reference to FIG. 2, a telecentric lens 100 according to the invention has a main opto-mechanical axis X and includes a front optical group 112 adapted to receive the rays coming from an object 2 to be observed and a rear optical group 114 adapted to convey said rays towards a sensor 30 of the vision appliance. The telecentric lens aperture, indicated with reference numeral 16, is located between the front optical group 112 and the rear optical group 114.

The front optical group 112 is intended to collect the rays coming from object 2 in such a way that the axis of each cone of rays is parallel to the main opto-mechanical axis X by virtue of the position of aperture 16 which lies in the focal plane of the front optical group 112 itself. The rear optical group 114, on the other hand, collects the rays that pass through aperture 16 and focuses them on a sensor 30 to enable the image formation. According to a preferred embodiment of this optical scheme, the rear optical group 114 is positioned so that aperture 16 is also arranged on the focal plane of the rear optical group 114 in such a way as to ensure that the lens is bi-telecentric. In a bi-telecentric lens, the cones of rays originating from object 2 and collected by the front optical group 112, once aperture and the rear optical group 114 have been crossed, reach sensor 30 so that the axis of said cone of rays is perpendicular to the plane of sensor 30 itself.

Recent improvements of lighting devices and cameras adopted in combination with the telecentric lenses have allowed increasing both the amount of light that the telecentric lens can collect, and thus convey on the sensor of a camera, and the efficiency of the camera in transforming the image created on the sensor by the telecentric lens into a digital signal with little noise, even in the presence of low lighting levels of the sensor.

According to one aspect of the invention, one aperture between the front optical group 112 and the rear optical group 114 consists of only two positive focal lenses 112'; 114'.

More preferably, both front and back optical groups consist of two positive focal lenses 112'; 114'.

In a preferred embodiment, the lenses of the front optical group 112 and/or the lenses of the rear optical group 114 are identical to each other.

In a preferred embodiment, the lenses of the front optical group 112 and/or the lenses of the rear optical group 114 are flat-convex lenses.

In a preferred embodiment, the lenses of the front optical group 112 and/or the lenses of the rear optical group 114 are made of Crown glass.

In a preferred embodiment shown in FIG. 3, the front lenses 112' of the front optical group 112 are flat-convex lenses and oriented with the convex surface facing the object observed, while the rear lenses 114' of the rear optical group 114 are flat-convex lenses with the respective convex surfaces facing each other. The particular configuration of this embodiment of the telecentric lens, in the shape and arrangement of the lenses, allows obtaining an image characterised by the correction of the chromatic aberration even in the absence of lenses made of Flint glass.

In a practical embodiment, the front lenses 112' made of Crown glass are identical to each other, have a first radius of curvature R1 of 187 mm and a first maximum thickness T1 of 8.2 mm. The rear lenses 114' made of crown glass are identical to each other, have a second radius of curvature R2 of 32.4 mm and a second maximum thickness T2 of 8.5 mm.

Therefore, advantageously, the telecentric lens 100 is devoid of optical elements with negative focal length and is devoid of optical elements made of Flint glass.

This design ensures the manufacture of telecentric lenses with telecentric lighting which are very compact and significantly cheaper than those currently on the market.

In one embodiment, such a simplified design of the telecentric lens is associated with and made possible by an aperture 16 of the telecentric lens equal to f/12 or smaller.

The telecentric lens 100 described above can be advantageously used in a vision appliance 1, in particular for making dimensional measurements of objects, in synergistic combination with a lighting device 20 as described below. Such a vision appliance 1 therefore comprises a telecentric lens 100 and a lighting device 20 adapted to illuminate an object 2 to be observed.

According to another aspect of the invention, the lighting device 20 comprises a semi-reflector element 22, known in technical jargon also by the term of "beam splitter", placed beyond the front optical group 112 in the direction of the object 2 be observed. This semi-reflector element 22 has substantially the shape of a portion of surface of a paraboloid. The lighting device 20 also comprises a lighting source 24 positioned in the focus of said paraboloid.

In this way, as shown in FIG. 4, the rays of light coming from the lighting source 24 are reflected by the semi-reflector element 22 and are sent towards the object to be observed 2 parallel to each other and to the main optomechanical axis X. The illumination of the object is therefore collimated and thus suitable for the telecentric vision.

It is noted that the rays of light in their path forward, do not pass through the optical system of the telecentric lens 100, in particular they do not pass through the front optical group 112.

The rays of light, once the object has been reached, are reflected thereby and return towards the telecentric lens 100, passing through the semi-reflector element 22.

In this way, the following advantages are obtained:
absence of stray-light within the optical system;
the optical system does not require polariser/analyser pairs in order to reduce the stray-light phenomenon;
the effects of astigmatism of the image are reduced, since the semi-reflector element is placed outside the telecentric optics.

In one embodiment, the semi-reflector element 22 is made of glass or transparent plastic. Its surface can then be treated with a coating that makes it partially reflective.

In a preferred embodiment, the surface of the semi-reflector element 22 has an extension at least equal to that of the optical element of greatest extension of the front optical group 112 (or the front lens) of the telecentric lens 100.

In addition, the acceptance angle β of the light of the semi-reflector element 22 is greater than the acceptance angle α of the rays of the front optical group 112. Therefore, the semi-reflector element 22 collects and then reflects on object 2 an amount of light emitted by the lighting source 24 that is greater than that which the front group is able to collect if the semi-reflector element is positioned between the front group and the telecentric lens aperture, as happens in the prior art.

Thanks to such a lighting system, the performance of the vision appliance is not affected by the fact that the telecentric lens 100 is made with the unusually simplified optical design described above.

In particular, since the lighting device is positioned downstream of the front optical group of the telecentric lens, it is no longer necessary to prevent internal reflections caused by the lenses of the front group of the lens itself.

Moreover, it is not necessary to implement a lens with a wide aperture to compensate for brightness losses.

According to a further aspect of the invention, the semi-reflector element 22 can be made with rectangular shape, when viewed frontally. In other words, the surface portion of the paraboloid is delimited by four sides, two by two parallel and opposite. In this way, the following advantages are obtained:
reduced mechanical size of the lighting device;
reduced manufacturing cost of the semi-reflector element;
projection on the object to be observed of a rectangular light area that clearly indicates the observation target for a telecentric lens that integrates a camera with a sensor which is also rectangular.

It is noted that the lighting device 20 can be implemented either within the same casing that accommodates the optical system of the telecentric lens 100, thus forming a single body with the same telecentric lens, or in the form of an accessory to be coupled, only in case of need, to a telecentric lens 100.

Therefore, it is also an object of the present invention a vision appliance including a lighting device for a telecentric lens comprising a semi-reflector element having substantially the shape of a portion of surface of a paraboloid and a lighting source positioned in the focus of said elliptical paraboloid. The lighting device is provided with an interface for coupling to the front group of a telecentric lens, so that the rays of light coming from the lighting source and reflected by the semi-reflector surface are parallel to each other and to the main opto-mechanical axis of the telecentric lens.

A man skilled in the art may make several changes, adjustments and replacements of elements with other functionally equivalent ones to the embodiments of the telecentric lens according to the invention in order to meet incidental needs, without departing from the scope of the following claims. Each of the features described as belonging to a possible embodiment can be obtained independently of the other embodiments described.

The invention claimed is:
1. A telecentric lens, comprising:
a front optical group adapted to receive rays coming from an observed object and a rear light optical group adapted to convey said rays towards a sensor, and
an aperture located between the front optical group and the rear light optical group,
wherein each of the front optical group and the rear optical group consists of two positive focal lenses, characterised in that the lenses of the front optical group are flat-convex spherical lenses and oriented with the convex surface facing the object observed, and wherein the lenses of the rear optical group are flat-convex with the respective convex surfaces facing each other.

2. Telecentric lens according to claim 1, wherein the lenses of the front optical group and/or the lenses of the rear optical group are identical to each other.

3. Telecentric lens according to claim 1, wherein the lenses of the front optical group and/or the lens of the rear optical group are made of Crown glass.

4. Telecentric lens according to claim 1, wherein the aperture is equal to or less than f/12.

5. Telecentric lens according claim 1, wherein the aperture lies on a focal plane of the rear optical group.

6. Appliance for artificial vision, in particular for performing dimensional measurements of objects, comprising:
    the telecentric lens of claim 1 and a lighting device suitable for lighting the object to be observed,
    wherein said telecentric lens comprises a main opto-mechanical axis, and wherein said lighting device comprises a semi-reflector element placed beyond the front optical group in the direction of the object to be observed, and the semi-reflector element substantially having the shape of a portion of surface of a paraboloid, the lighting device comprising a lighting source positioned in a focus of said paraboloid, in such a way that the rays of light coming from the lighting source and reflected by the semi-reflector element are parallel to each other and to said main opto-mechanical axis.

7. Appliance according to claim 6, wherein the semi-reflector element has an extension at least equal to that of the optical element of greatest extension of the front optical group of the telecentric lens.

8. Appliance according to claim 6, wherein an acceptance angle of the light of the semi-reflector element is greater than an acceptance angle of the rays of the front optical group.

9. Appliance according to claim 6, wherein the semi-reflector element, when seen from the front, is a rectangular shape.

* * * * *